Sept. 7, 1937.  D. SILVERMAN  2,092,093
RESISTANCE WELDING
Filed May 26, 1934
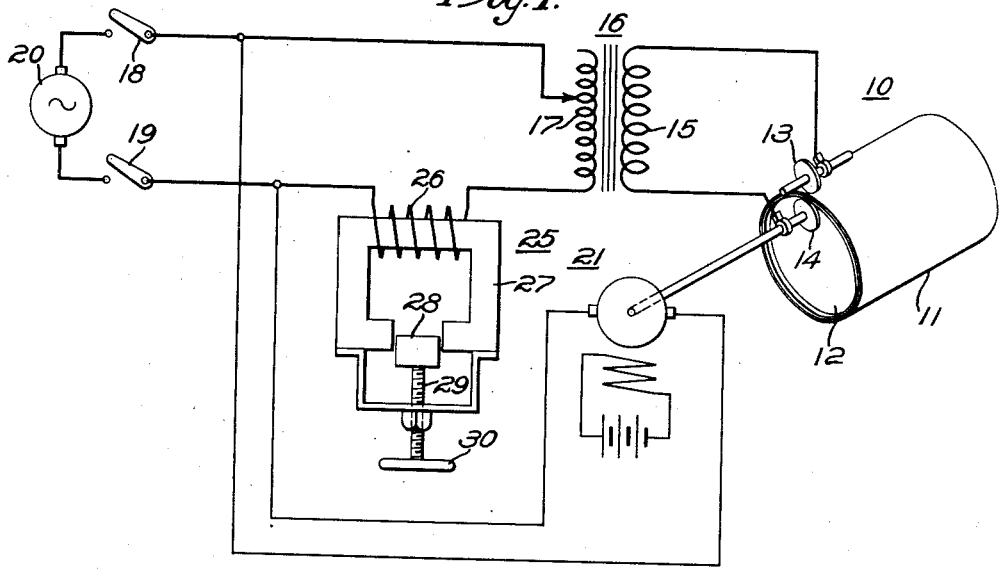
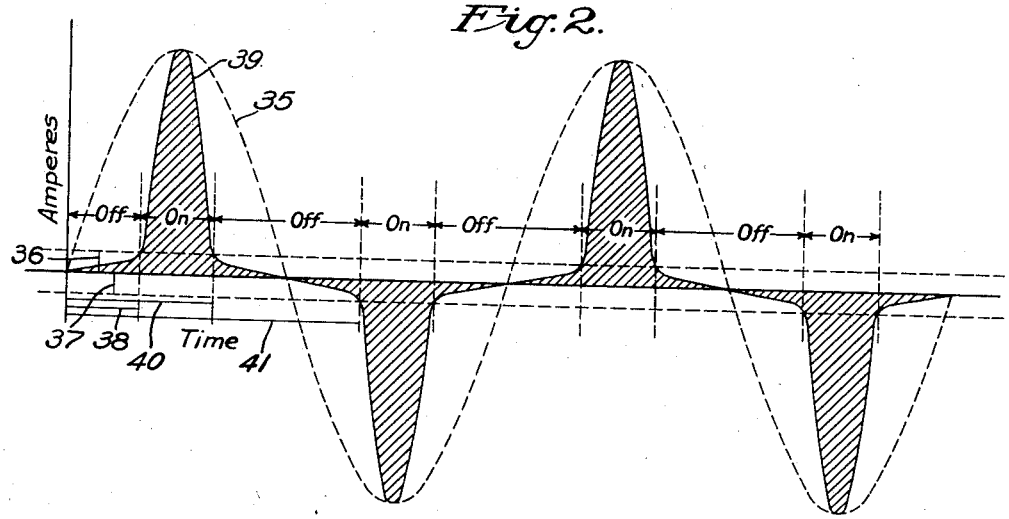
WITNESSES:
P. J. Fitzgerald
R. R. Lockwood
INVENTOR
Daniel Silverman.
BY
M. Crawford
ATTORNEY Patented Sept. 7, 1937

2,092,093

UNITED STATES PATENT OFFICE 2,092,093

RESISTANCE WELDING

Daniel Silverman, Brooklyn, N. Y., assignor to Westinghouse Electric & Manufacturing Company, East Pittsburgh, Pa., a corporation of Pennsylvania Application May 26, 1934, Serial No. 727,762

6 Claims. (Cl. 219—10)

My invention relates, generally, to electric welding and it has particular relation to resistance welding.

In order to control the current flow in resistance welding systems using alternating current, various types of controls have been proposed. These have included circuit opening devices in the welding circuit which were arranged to open it at predetermined intervals which might or might not be synchronized with the frequency of the alternating current. Another system that has been proposed comprises the use of space discharge devices connected directly in the welding circuit which are arranged to become conducting and which characteristically become non-conducting at the end of a half cycle unless they are again caused to be conducting. A further system comprises the use of a variable impedance device in the welding circuit, the impedance of which is varied by means of space discharge devices to change its effectiveness from a very low value to permit the flow of welding current to a very high value to prevent the flow of welding current.

All of the foregoing systems have been used when it is desired to perform the welding operation under a wide variety of conditions. Thus where a single welding system is expected to weld work comprising different kinds and thicknesses of material, such systems are desirable in view of the fact that they may be adjusted to provide for the individual characteristics which are required for each particular type and thickness of material.

All of the foregoing systems are based on the fundamental idea of measuring out a certain number of cycles of the alternating current for each particular welding operation. When any synchronizing is provided between the movement of the work and the alternating current, advantage is taken of the fact that the circuit may be opened at the zero point of the current wave without causing arcing. When the space discharge devices are used, of course, advantage is taken of the characteristic that they inherently tend to become non-conducting at the end of any half cycle.

If the mechanical switch or circuit opening device is provided, it is necessary to time its operation so that the circuit will be opened at the exact zero point of the current wave. If this is not done, severe arcing at the contacts will be caused which will result in their rapid deterioration.

When the variable impedance control system is provided the circuit is either conducting or non-conducting, depending upon whether the secondary winding of the impedance device is short-circuited or open-circuited. For example, when the secondary winding is short-circuited the impedance of the device is reduced to the minimum value as will be readily understood, and current in the welding circuit will be permitted to flow. When the secondary winding is open-circuited, the impedance of the device will be very high and for practical purposes, the current flow in the welding circuit will be reduced to zero.

The object of my invention, generally stated, is to provide a resistance welding system which shall be simple, efficient and accurate in operation, and which may be readily and economically manufactured and installed.

The principal object of my invention is to provide for controlling the flow of current in a resistance welding system.

Another important object of my invention is to provide for correlating the application of welding current and speed with which the work is moved to properly space the individual welds.

Another important object of my invention is to provide for applying a symmetrical portion of each succeeding half cycle of alternating current to form an individual weld.

A further object of my invention is to provide for compensating for changes in impedance of a welding circuit when the saturable reactor used for controlling the flow of current is adjusted for different degrees of saturation in order to maintain the maximum values of the welding current under different operating conditions at the same value.

Other objects of my invention will, in part, be obvious and, in part, appear hereinafter.

My invention, accordingly, is disclosed in the embodiment hereof shown in the accompanying drawing, and comprises the features of construction, combination of elements, and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which:

Figure 1 illustrates diagrammatically a resistance welding circuit organized in accordance with my invention; and, Fig. 2 shows a number of curves which demonstrate graphically the characteristics of a welding circuit operated in accordance with my invention.

In the past, in the sealing of ordinary tin cans, it has been the practice to solder the lid on each can. No other system, so far as I am aware, has been developed which was capable of joining the top of the can to the main body of it as economically as could be done by the soldering method. It has been proposed to seal the covers to the cans by welding but no satisfactory and economical system has been previously developed for effecting this operation.

When it is desired to perform such an operation, it will be understood that the apparatus would be arranged to repeat the same operation over a long period of time. The apparatus would be designed for a particular set of conditions and it would not be expected to be widely adjustable to adapt itself for a wide range of conditions.

With this idea in mind, I propose to apply alternating current directly to perform the welding operation and to move the work, such as the can mentioned hereinbefore, at a speed which corresponds to the frequency of the alternating current. In order to provide for the proper time interval between successive welding operations, I propose to prevent the flow of current in each half cycle during predetermined intervals at the beginning and end of each half cycle. The only time during which welding current is permitted to flow is during the central portion of each individual half cycle. When the work is moved at the proper speed, it will be understood that individual welds will be formed and that the material will not be burned due to the fact that the welding current is applied only during relatively short intervals.

I propose to obtain the foregoing described type of current flow or wave form of the alternating current by providing a saturable reactor in the welding circuit. During the first portion of each half wave of the alternating current, the reactor will not be saturated and very little current will be permitted to flow. However, on the application of the central portion of the alternating current wave, the reactor will become saturated and current will be permitted to flow during this central portion. During the last portion of the half wave of alternating-current, the reactor will not be saturated and the current will be reduced to a value which is below that necessary to perform the welding operation. By this means it is possible to obtain a period between current peaks which is sufficiently long to prevent the work from being overheated and burned, as would otherwise be the case if the full wave of alternating current were applied for performing the welding operation.

Referring particularly to Fig. 1 of the drawing, the reference character 10 designates, generally, a can comprising a main body member 11 and a lid 12, which are arranged to interfit as illustrated, and which it is desired to weld together. The top 12 may be arranged to interfit with the main body member 11 in order to provide a rim which may be positioned between a pair of roller welding electrodes 13 and 14 for performing the welding operation.

The welding electrodes 13 and 14 may be connected to a secondary winding 15 of a transformer shown generally at 16, having a tapped primary winding 17 which is connected through switches 18 and 19 to a source 20 of alternating current which may be adapted to generate a commercial frequency, such as 60 cycles.

In order to move the can 10 relative to the electrodes 13 and 14, a synchronous motor, shown generally at 21, is provided having driving connection, as illustrated, with the electrode 14. The motor 21 may be connected to be energized from the generator 20, so that the movement of the can 10 between the electrodes 13 and 14 may be synchronized with the frequency of the source 20. It will be understood, however, that it is not necessary to use a synchronous motor as illustrated and described herein, and that any suitable driving means may be provided which will move the can 10 at a fixed speed relative to the electrodes 13 and 14 so that the proper spacing of the individual welds may be obtained.

In order to control the flow of current so that individual welds may be obtained, a saturable reactor, shown generally at 25, is provided, having a winding 26 connected in series circuit relation with the primary winding 17 of the transformer 16. The winding 26 is wound on an iron core 27, the saturation of which may be varied by means of a wedge 28 carried by a screw 29 which may be adjusted by means of a hand wheel 30. In order to compensate for change in impedance of the system due to change in the positions of the wedge 28 to maintain the same peak value of current, the tapped primary winding 17 may be adjusted, as will be readily understood.

With a view to more clearly understand the functioning of my novel welding system, reference may be had to the curves illustrated in Fig. 2 of the drawing. The curves were plotted with current values as ordinates and time intervals as abscissae. The broken line curve 35 represents the normal sinusoidal variations of the alternating current as it would be applied to perform the welding operation if the saturable reactor 25 were not provided for altering its shape.

It will be readily understood that if alternating current having a wave shape as represented by curve 35 is applied to the work, proper welding cannot be ordinarily effected, due to the fact that there is not a sufficient time interval provided between successive applications of current to prevent undue heating of the work. As a result, the work would be severely burned, and it is practically impossible to perform the welding operation under these conditions.

Current values numerically greater than those represented by the ordinates 36 and 37 are sufficient to effect the welding operation while current values numerically less than these ordinates are not sufficient to effect the welding operation. When the saturable reactor 25 is provided, the current in the welding circuit is maintained at a value less than that required for performing the welding operation for a time which may be represented by the abscissa 38. At the end of this time interval, the saturating characteristics of the reactor 25 become effective and current is permitted to flow having a wave shape which will be represented by the curve 39, the area under which is hatched in order to illustrate the quantity of current which is applied.

After the expiration of a time interval which may be represented by the difference between the abscissae 40 and 38, the welding current will be reduced to a value which is below that required for performing the welding operation and will continue to remain below this value until a time in the next succeeding half cycle which may be represented by the abscissa 41. At this time, the saturation characteristics of the reactor 25 will again become effective and the foregoing current cycle will be repeated.

It will be observed that the time during which current sufficient to perform the welding operation is permitted to flow may be represented by the "on" period while the time during which current sufficient to perform the welding operation is not permitted to flow may be represented by the "off" period, as illustrated in Fig. 2 of the drawing. By moving the work being welded at a predetermined fixed rate of speed between the welding electrodes 13 and 14, it is possible to make individual welds which will be spaced apart from each other a distance depending upon the rate at which the work is moved.

Thus, if the work is moved at the rate of 37 feet per minute, between the welding electrodes 13 and 14, and a 60-cycle source of alternating current is provided for performing the welding operation, the individual welds will be spaced approximately 1/16 of an inch apart. It will, of course, be obvious that various other combinations of speed and frequency may be used without departing from the scope of my invention.

In the embodiment of the invention referred to hereinbefore, I have described mechanical means for adjusting the saturation of the reactor 25. Such means are preferably employed for the reason that once adjusted to the desired welding conditions, no further adjustment is required. While it is understood that the saturation of the reactor 25 may be altered by the application of a saturating flux as may be provided by a winding connected to a direct-current source, such a system of regulation is not desirable since it would require the application of a certain amount of power which would be comparatively expensive over a long period of time.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. The method of fastening together thin elements by resistance welding with apparatus including an alternating current source of at least commercial frequency and welding electrodes coupled to said source which comprises the steps of moving said elements relative to said electrodes and in contact therewith and passing a current impulse, having a wave front steeper than the corresponding portion of sinusoidal waves of the same amplitude as said impulse and of the same frequency as said source, from said source through said elements during each half-period of said source, the commencement of a current impulse taking place a predetermined appreciable interval of time after the termination of a preceding current impulse.

2. The method of fastening together thin elements by resistance welding with apparatus including a current source of at least commercial frequency and welding electrodes coupled to said source which comprises the steps of moving said elements relative to said electrodes and in contact therewith, and passing an impulse of current, having a wave front steeper than the corresponding portion of sinusoidal waves of the same amplitude as said impulse and of the same frequency as said source, and a magnitude considerably greater than the minimum current required for welding from said source through said element during each half-period of said source, each said impulse having a magnitude less than the minimum current required for welding for a considerable fraction of a half-period of said source.

3. The method of fastening together thin elements by resistance welding with apparatus including a current source of at least commercial frequency and welding electrodes coupled to said source which comprises the steps of moving said elements relative to said electrodes and in contact therewith in synchronism with said source, and passing an impulse of current, having a wave front steeper than the corresponding portion of sinusoidal waves of the same amplitude as said impulse and of the same frequency as said source, and a magnitude considerably greater than the minimum current required for welding from said source through said elements during each half-period of said source, each said impulse having a magnitude less than the minimum current required for welding for a considerable fraction of a half-period of said source.

4. The method of fastening together thin elements by resistance welding with apparatus including a current source of at least commercial frequency and welding electrodes coupled to said source which comprises the steps of moving said elements relative to said electrodes and in contact therewith, and passing an impulse of current, having a wave front steeper than the corresponding portion of sinusoidal waves of the same amplitude as said impulse and of the same frequency as said source, and a magnitude considerably greater than the minimum current required for welding from said source through said elements during each half-period of said source at points along said element spaced from each other a distance of the order of 1/16 inch, each said impulse having a magnitude less than the minimum current required for welding for a considerable fraction of a half-period of said source.

5. The method of fastening together thin elements by resistance welding with apparatus including a current source of at least commercial frequency and welding electrodes coupled to said source which comprises the steps of moving said elements relative to said electrodes and in contact therewith, and passing a single impulse of current, having a wave front steeper than the corresponding portion of sinusoidal waves of the same amplitude as said impulse and of the same frequency as said source, and a magnitude considerably greater than the minimum current required for welding and of duration short compared to a half-period of said source from said source through said elements during each half-period of said source.

6. The method of fastening a base of thin material to a cylindrical element of thin material with apparatus including an alternating current source of at least commercial frequency and a plurality of electrodes coupled to said source, which comprises disposing said base adjacent to said element in such manner that the periphery of said base is juxtaposed to the wall of said element, disposing said electrodes in contact with the periphery of said base and the wall of said element in such manner that any difference of potential between said electrodes is impressed across the junction region between the periphery of said base and the wall of said element, rotating said element in such manner that said electrodes always move tangential to the wall thereof and passing a current impulse of short duration compared to a half-period of said source and of magnitude considerably greater than the minimum current required for welding from said source, through said base and said element during each half-period of said source, said impulse having a wave front steeper than the corresponding portion of sinusoidal waves of the same amplitude as said impulse and of the same frequency as said source.

DANIEL SILVERMAN.